United States Patent
Giefer et al.

(10) Patent No.: US 6,684,730 B2
(45) Date of Patent: Feb. 3, 2004

(54) GEAR SHIFT DEVICE FOR AN AUTOMATIC TRANSMISSION

(75) Inventors: Andreas Giefer, Lemförde (DE); Jörg Meyer, Wagenfeld (DE)

(73) Assignee: ZF Lemförder Metallwaren AG, Dielingen (DE)

( * ) Notice: Subject to any disclaimer, the term of this patent is extended or adjusted under 35 U.S.C. 154(b) by 126 days.

(21) Appl. No.: 09/958,324

(22) PCT Filed: Feb. 8, 2001

(86) PCT No.: PCT/DE01/00491

§ 371 (c)(1),
(2), (4) Date: Oct. 5, 2001

(87) PCT Pub. No.: WO01/59333

PCT Pub. Date: Aug. 16, 2001

(65) Prior Publication Data

US 2002/0178855 A1 Dec. 5, 2002

(30) Foreign Application Priority Data

Feb. 8, 2000 (DE) .......................... 100 05 328

(51) Int. Cl.⁷ .......................... F16H 59/00; F16H 61/24
(52) U.S. Cl. .................. 74/473.23; 74/473.3; 74/527; 74/533
(58) Field of Search .................. 74/473.21, 473.22, 74/473.23, 473.24, 473.3, 527, 532

(56) References Cited

U.S. PATENT DOCUMENTS

| | | | | |
|---|---|---|---|---|
| 4,282,769 A | * | 8/1981 | Sandrock | 74/473.23 |
| 5,465,818 A | * | 11/1995 | Osborn et al. | 192/220.4 |
| 5,695,029 A | | 12/1997 | Yokoyama et al. | |
| 5,797,295 A | * | 8/1998 | Kataumi et al. | 74/483 R |
| 6,059,687 A | * | 5/2000 | Durieux et al. | 477/94 |

FOREIGN PATENT DOCUMENTS

| | | |
|---|---|---|
| DE | 41 18 519 A1 | 2/1993 |
| DE | 41 18 519 A1 Abs | 2/1993 |
| DE | 44 06 598 A1 | 9/1995 |
| DE | 44 06 598 A1 Abs | 9/1995 |
| DE | 196 28 099 A1 | 1/1998 |
| DE | 197 56 034 A1 | 7/1999 |
| DE | 197 56 034 A1 Abs | 7/1999 |
| EP | 0 943 843 A3 | 9/1999 |
| EP | 0 943 843 A2 | 9/1999 |
| EP | 0 943 843 A2 Abs | 9/1999 |
| EP | 0 943 843 A3 Abs | 9/1999 |
| JP | 04-64758 | * 2/1992 |

* cited by examiner

Primary Examiner—William C. Joyce
(74) Attorney, Agent, or Firm—McGlew and Tuttle, P.C.

(57) ABSTRACT

A shifting device for an automatic transmission is provided with a shifting mechanism, which is mounted in a housing pivotably around a axis within at least one shift gate. The shift mechanism detects the shift signals electrically, electromagnetically or optically and transmits them. The shift mechanism has a locking device, which is guided with the gearshift lever along a contour of a gate. The contour is associated with the shift positions (P, R, N, D, . . . ). A device is controlled as a function of the speed and can be pivoted between at least two positions (active/inactive) around an axis and can be pivoted against the locking device in at least one shift position, so that the gearshift lever remains in the preselected shift position or is automatically returned into that shift position.

20 Claims, 4 Drawing Sheets

GEAR SHIFT DEVICE FOR AN AUTOMATIC TRANSMISSION

FIELD OF THE INVENTION

The present invention pertains to a shifting device for an automatic transmission with a shifting mechanism mounted in a housing pivotably around an axis within at least one shift gate. The shifting mechanism detects the shift signals electrically, electromagnetically or optically and transmits them. The shifting mechanism has a locking device which is guided with the gearshift lever along a contour of a gate. The contour is associated with the shift positions (P, R, N, D, . . . ).

BACKGROUND OF THE INVENTION

Such shifting devices for the powerless transmission of shift commands to an automatic transmission of a motor vehicle have a gearshift lever mounted pivotably around at least one axis in a housing in at least one shift gate. The gearshift lever detects the shifting signals electrically, electromagnetically or optically and transmits them correspondingly. A locking device, which is guided with the gearshift lever along a contour of a shifting gate, which contour is associated with one of the shift positions (P, R, N, D, . . . ), makes possible the simulation of the individual shift positions for the driver of the vehicle in order to impart a "feeling of shifting" to the driver. Such a shifting device has been known, e.g., from the patent application DE 197 56 034 A1.

These prior-art, so-called "shift by wire" shifting devices transmit the shift commands mostly to an electronic control device, which transmits the corresponding shift command to the automatic transmission as a function of optionally preselected parameters when this is permitted by the driving conditions of the vehicle. Thus, there is a permanent set point-actual value comparison. The driver of the vehicle can theoretically select another, actually unacceptable shift position with the gearshift lever during travel without this shift position being immediately transmitted to the transmission, because the permissible parameters, e.g., the speed of the vehicle, do not agree with the gear selected.

Thus, it would also be conceivable that the reverse gear is selected even though the vehicle is moving forward. However, the automatic transmission would not shift. However, if the preset parameters are reached during travel, i.e., e.g., the speed drops below a certain limit value, the control device transmits the reverse gear selected before by mistake to the automatic transmission and the corresponding gear is engaged. This may lead to accidents, e.g., in intersections.

SUMMARY AND OBJECTS OF THE INVENTION

The basic technical object of the present invention is to provide a shifting device which effectively avoids shifting errors.

According to the invention, a shifting device for an automatic transmission is provided with a shifting mechanism, which is mounted in a housing pivotably around a axis within at least one shift gate. The shift mechanism detects the shift signals electrically, electromagnetically or optically and transmits them. The shift mechanism has a locking device, which is guided with the gearshift lever along a contour of a gate. The contour is associated with the shift positions (P, R, N, D, . . . ). A device is controlled as a function of the speed and can be pivoted between at least two positions (active/inactive) around an axis and can be pivoted against the locking device in at least one shift position, so that the gearshift lever remains in the preselected shift position or is automatically returned into that shift position.

Accidental shifting errors can be effectively prevented from occurring with a shifting device with a device, which is controlled in a speed-dependent manner and can be pivoted between at least two positions (active/inactive) around an axis and can be pivoted against the locking device in at least one shift position. This allows the gearshift lever to remain in the preselected shift position or it is automatically returned into that shift position. The shifting device has a very simple design and the device can likewise be switched or controlled via the central control device.

According to another embodiment of the present invention, a ramp lever pivotable around an axis is used as the device pivotable between at least two positions (active/inactive), the ramp lever assuming a position that prevents the accidental selection of the reverse gear during travel in at least one forward gear of the gearshift lever.

This ramp lever may have a contact surface rising in a ramp-like manner on its side facing the locking device.

The ramp lever is preferably coupled with an adjusting member, which may be a linkage, an electromagnet or a hydraulically or pneumatically acting adjusting device.

The adjusting member has an adjusting element, which has variable length, can be pivoted around a mounting point and is coupled with the ramp lever at a spaced location from its axis, so that a change in the length of the adjusting element exerts a leverage acting on the ramp lever, so that the ramp lever can be pivoted between an activated position and an inactivated position.

Corresponding to a variant of the present invention, the ramp lever assumes an activated position which prevents a shifting error when the speed of the vehicle is higher than a preset limit value of, e.g., 5 km/sec and the forward gear (D) is selected.

The gearshift lever can thus be pivoted only between the shift positions "N" and "D" with the ramp lever activated and the locking device is moved along the rising contact surface of the locking lever with increasing force applied during a movement in the direction of a shifting error, i.e., e.g., from a forward gear into the shift position "R," so that the gearshift lever will automatically assume the neutral position "N" or the gear "D" selected previously after it has been released by the driver of the vehicle.

On the side facing the locking device, the ramp lever can have a contour corresponding to a shifting gate at least in some sections. This has the advantage that a changeover between the shift positions "D" and "N" is possible with the ramp lever activated and only the selection of the reverse gear is prevented.

Corresponding to another embodiment according to the present invention, the locking device may include a leaf spring fastened to the gearshift lever, at the free end of which a mount with a contour roller mounted freely rotatably in it is present, which rolls on the contour of the shifting gate. The contour of the shifting gate may have a wave-shaped design in the known manner, with each wave valley corresponding to one shift position (P, R, N, D, . . . ).

The features of the present invention which were mentioned above and will be explained below can, of course, be used not only in the particular combination indicated but in other combinations as well, additionally or alone, without going beyond the scope of the present invention.

The embodiment of shifting device which is preferred according to the present invention will be described in greater detail below in a greatly simplified representation based on the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
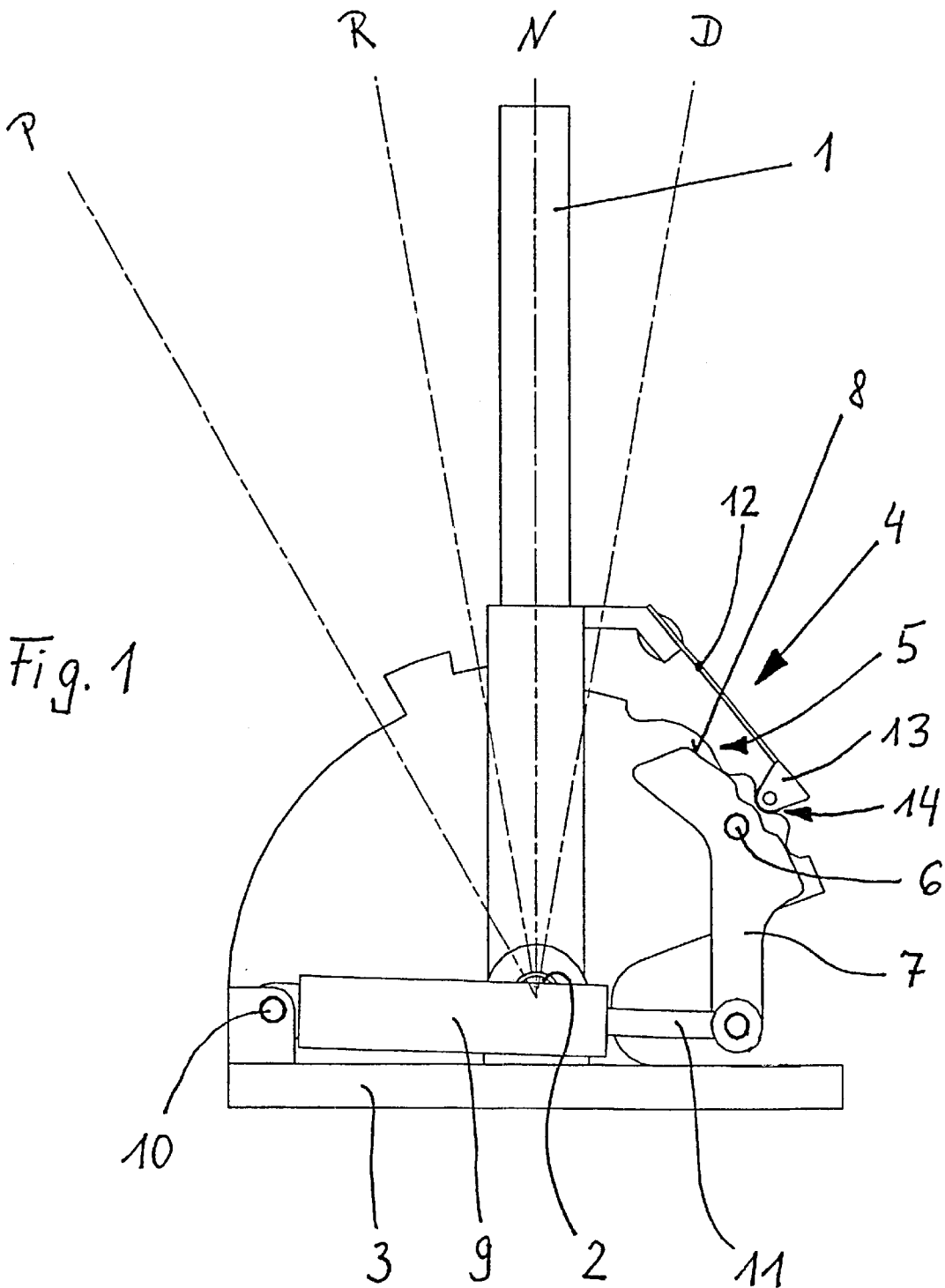
FIG. 1 is a side view of the interior of a shifting device according to the present invention in shift position "N"

Referring to the drawings in particular, a locking device, designated as a whole by 4, is arranged in the figures at a gearshift lever 1 pivotable around an axis 2 within a shift gate. This locking device 4 comprises a leaf spring 12, whose end forms a mount 13 with a contour roller 14 held therein. In this embodiment the contour roller 14 rolls on a gate-like contour 5 of the shifting device, which is part of the housing 3. The gate 5 has a wave shape in the known manner, with a shift position (P, R, N, D, . . . ) of the shifting device corresponding to or being set relative to each valley of the wave. Since the shifting device shown is a so-called "shift by wire" shifting device, the shift positions (P, R, N, D, . . . ) selected by the driver of the vehicle are detected as signals corresponding to the position of the gearshift lever 1 and transmitted to a control device of the transmission. The control device continuously performs set point-actual value comparisons and energizes the changeover of the automatic transmission only as a function of predefined shifting parameters. Due to this manner of detection and transmission of the shifting signals, there is no mechanical connection to the automatic transmission. The driver of the vehicle does not have the "feeling of shifting." This can be simulated to some extent by the gate 5.

The shift position "D" is engaged during forward travel, while a changeover to the shift position "N" may also take place when an intersection is being approached. As long as the forward gear "D" is selected, it is theoretically possible that the driver of the vehicle accidentally moves the gearshift lever 1 into an unacceptable shift position (e.g., "R") by actuating the gearshift lever 1. Since the transmission does not directly receive the corresponding shift command due to the control via an intermediate control device, nothing will happen as long as the predefined parameters are met and recognized by the control device. For example, the reverse gear can be engaged only below a speed of 5 km/hour. This entails needless accident hazards especially during slow travel at intersections, so that a shifting device according to the present invention has a device 7, which is pivoted against the locking device 4 in at least one shift position (e.g., in "D"), so that the gearshift lever 1 remains in the preselected shift position or is automatically returned into this position. A ramp lever 7, which has a contact surface 8 on its side facing the locking device 4, is used for this purpose in the embodiment shown in the figures, with a contour roller 14 projecting laterally beyond the gate 5 sliding along on the contact surface 8, which is visible in FIG. 4. With the ramp lever 7 activated, the rise of this contact surface causes the further movement of the gearshift lever 1 in the direction of the unacceptable shift position (here "R" or "P") to require the application of an increasing force and it ultimately prevents the selection of this gear altogether, because the gearshift lever 1 will automatically return into its original position after it has been released by the driver of the vehicle.

The ramp lever 7 is mounted in the housing 3 pivotably around an axis 6. In its extended section present under the axis 6, it is connected to an adjusting member 9, which is an electromagnet, whose length-adjustable adjusting element (armature) 11 comes directly into contact with the ramp lever 7. The adjusting member 9 is in turn mounted in a mounting point 10 and is slightly pivotable around same.

Figure 3:
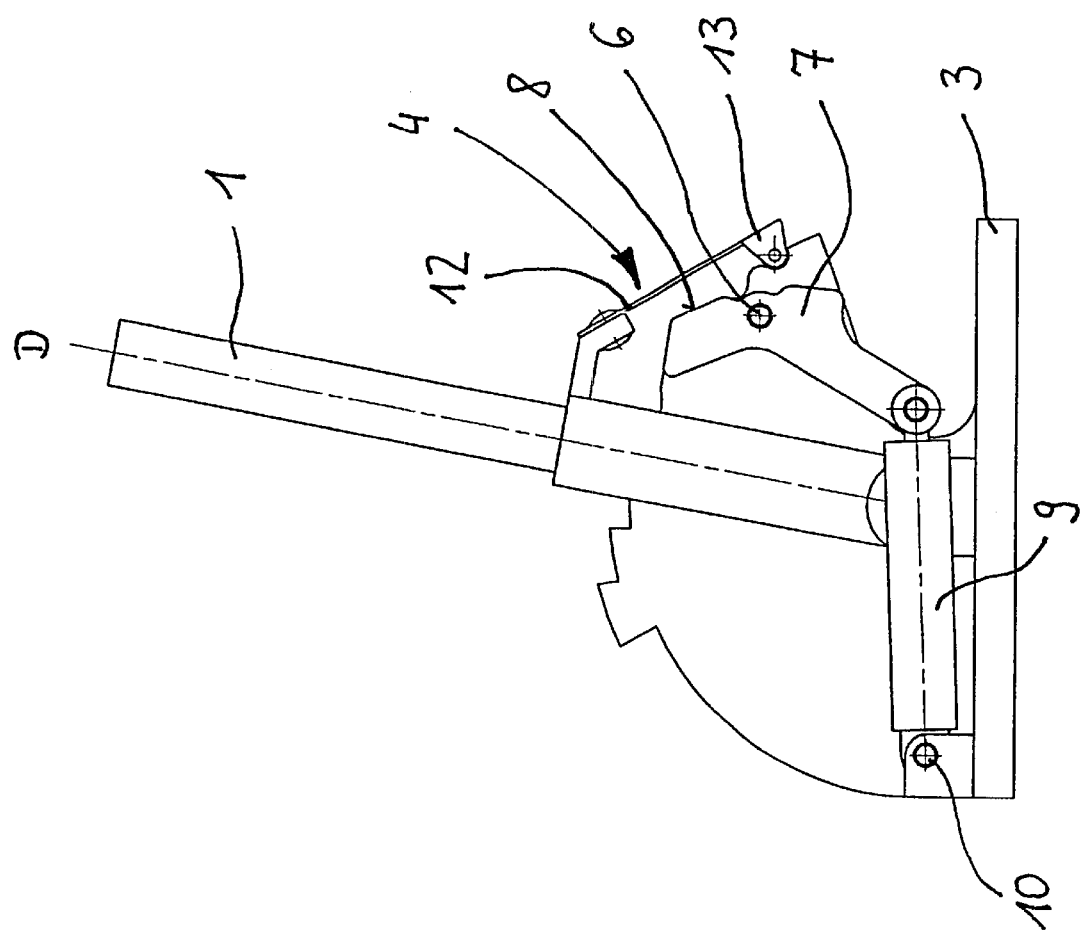
FIG. 3 is a side view of the interior of a shifting device according to the present invention in shift position "D"

The figures differ in that FIG. 3 shows an activated ramp lever 7, i.e., the adjusting element 11 of the adjusting member 9 is completely withdrawn and the ramp lever 7 is pivoted around the axis 6 in the direction of the locking device 4, so that the rising contact surface 8 of the ramp lever 7 prevents the selection of the reverse gear "R" not permitted during forward travel.

Figure 2:
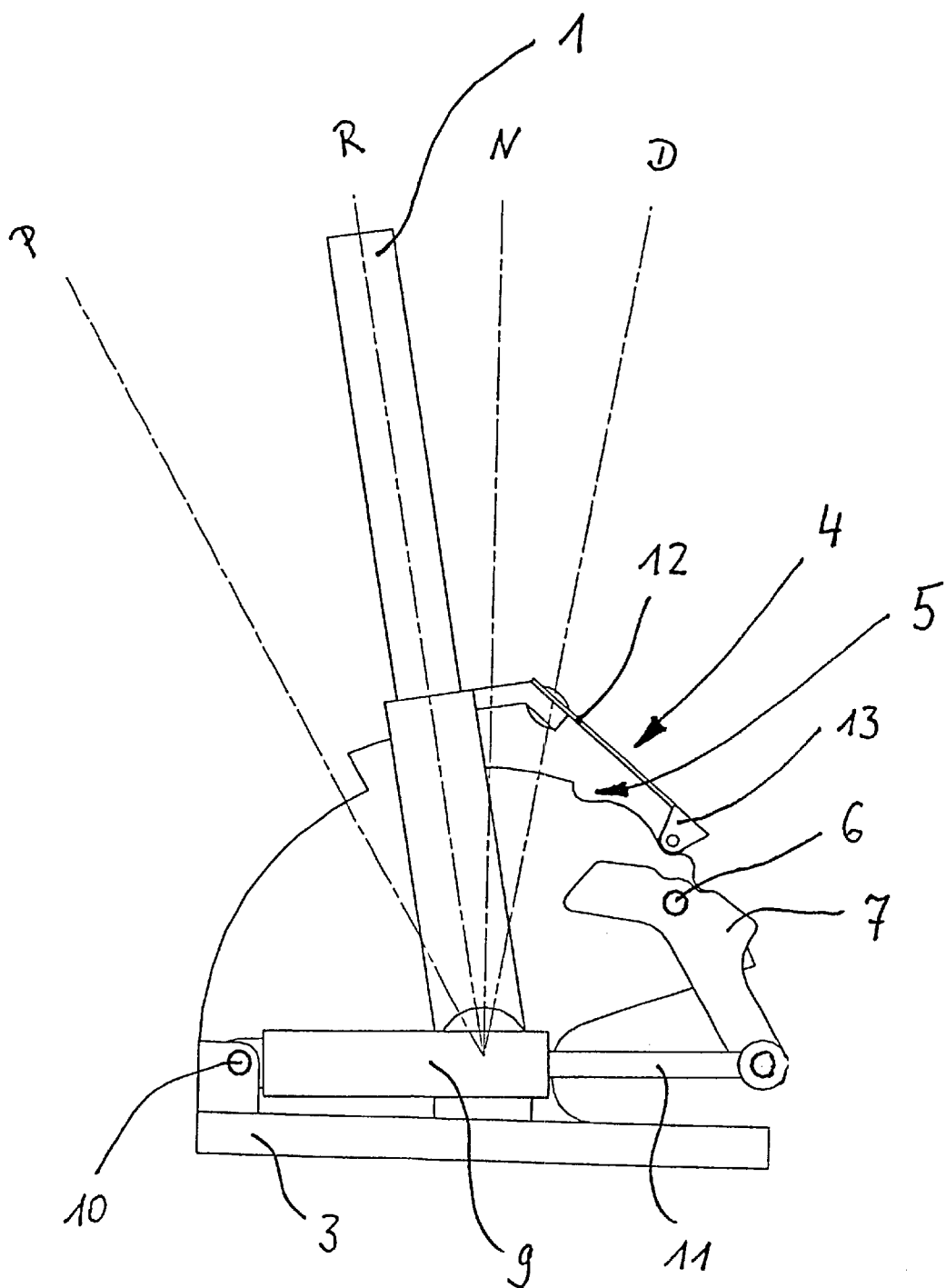
FIG. 2 is a side view of the interior of a shifting device according to the present invention in shift position "R"
Figure 4:
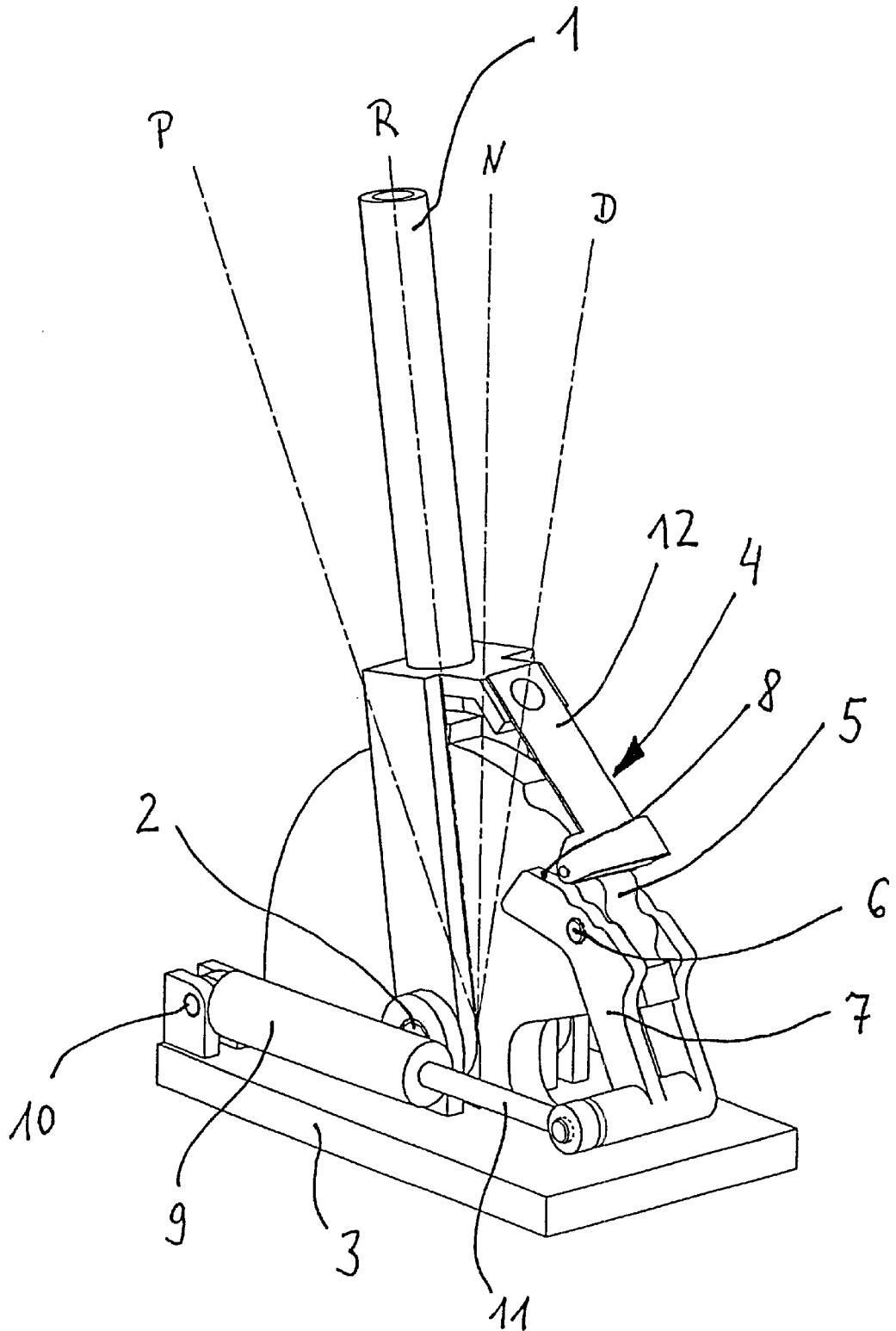
FIG. 4 is a three-dimensional view of the interior of a shifting device according to the present invention in shift position "R."

FIGS. 1, 2 and 4 show, in contrast, an inactivated ramp lever 7, i.e., all gears are freely selectable here, which shall be possible at a speed below 5 km/hour.

While specific embodiments of the invention have been shown and described in detail to illustrate the application of the principles of the invention, it will be understood that the invention may be embodied otherwise without departing from such principles.

What is claimed is:

1. A shifting device for a vehicle automatic transmission, the shifting device comprising:

a housing;

a shift gate positioned relative to said housing;

a gear shift lever mounted relative to said housing pivotably around an axis, said gear shift lever moving within at least one shift gate and providing a shift position signal electrically, electromagnetically or optically and transmits the shift position signals;

a locking device guided with the gearshift lever along a contour of said gate, said contour being associated with shift positions;

a ramp lever controlled as a function of vehicle speed, said ramp lever being pivoted between at least two positions around a lever pivot axis, said ramp lever being pivotable against said locking device in at least one shift position to maintain said gearshift lever in the preselected shift position or automatically returning the gearshift lever into the preselected shift position, said ramp lever bas a contact surface rising in a ramp-like manner on a side facing said locking device, said locking device being movable along said contact surface of the ramp lever in said one position.

2. A shifting device for an automatic transmission in accordance with claim 1, wherein said ramp lever assumes a position that prevents the accidental selection of the reverse gear during travel in at least one forward gear of said gearshift lever.

3. A shifting device for an automatic transmission in accordance with claim 2, wherein said ramp lever assumes an activated position preventing a shifting error when a speed of the vehicle is greater than a preset limit value and a forward gear is selected.

4. A shifting device for an automatic transmission in accordance with claim 3, wherein said preset limit value is 5 km/hour.

5. A shifting device for an automatic transmission in accordance with claim 2, wherein said ramp lever has a contour corresponding to said gate at least in some sections on a side facing said locking device.

6. A shifting device for an automatic transmission in accordance with claim 2, wherein said ramp lever it an inactive position is pivoted out of an engagement area of said locking device around said lever pivot axis.

7. A shifting device for an automatic transmission in accordance with claim 1, wherein said ramp lever has a coupling with an adjusting member.

8. A shifting device for an automatic transmission in accordance with claim 7, wherein the said adjusting member is a Bowden cable, a linkage, an electromagnet or a hydraulically or pneumatically acting adjusting device.

9. A shifting device for an automatic transmission in accordance with claim 8, wherein said adjusting member is pivotable around a mounting point and has a length-adjustable adjusting element coupled with said ramp lever at a spaced location from said lever pivot axis such that a change in length of said adjusting element exerts a leverage acting on the ramp lever.

10. A shifting device for an automatic transmission in accordance with claim 9, wherein said gearshift lever can be pivoted only between shift positions "N" and "D" when said ramp lever is activated and during a movement in the direction of a shifting error, said locking device being moved along a said rising contact surface of the locking lever only by applying increasing force such that said gearshift lever will automatically assume again neutral position "N" or the gear "D" selected previously.

11. A shifting device for an automatic transmission in accordance with claim 7, wherein:

said adjusting member is pivotally mounted to a mounting point.

12. A shifting device for an automatic transmission in accordance with claim 1, wherein said locking device comprises a leaf spring fastened to said gearshift lever, said leaf spring having a free end forming a mount with a contour roller mounted rotatably therein and rolling on a contour of said gate.

13. A shifting device for an automatic transmission in accordance with claim 12, wherein said contour of said gate has a wave-shaped design, where each valley of the wave corresponds to a shift position.

14. A shifting device for an automatic transmission in accordance with claim 1, wherein:

said locking device includes a contour roller projecting laterally from said shift gate and movable along said contact surface.

15. A shifting device for a transmission, the shifting device comprising:

a housing defining a shift gate with a plurality of shift positions;

a gear shift element arranged in said shift gate and movable into said plurality of shift positions, said gear shift element generating a shift position signal identifying in which of said shift positions said gear shift element is positioned;

a locking device arranged with the gearshift lever, said locking device defining a protrusion and a contour with a plurality of valleys, each of said valleys being associated with one of said plurality of shift positions, said protrusion and said plurality of valleys biasing said gear shift element in a respective said one of said shift positions;

a ramp lever movable between an active position interacting with said locking device to bias said gear shift element in a preselected one of said shift positions, and movable to an inactive position out of interference with said locking device, said ramp lever having a contact surface contacting said protrusion in said active position to bias said gear shift element into said preselected said shift position when said gear shift element is in a non-preselected shift position.

16. A device in accordance with claim 15, wherein:

said contact surface has a shape to bias said gear shift element in a plurality of preselected shift positions in said active position.

17. A device in accordance with claim 15, wherein:

said contact surface in said active position allows movement of said gear shift element into said non-preselected said shift position and applies a force returning said gear shift element to said preselected shift position when said gear shift element is in said non-preselected shift position.

18. A device in accordance with claim 17, wherein:

said protrusion rides along said contact surface in said active position when said gear shift element moves into said non-preselected shift position.

19. A device in accordance with claim 18, wherein:

said contact surface in said active position prevents said protrusion from entering said valley of said non-preselected shift position.

20. A device in accordance with claim 17, wherein: said gear shift element generates said shift position signal electrically, electromagnetically or optically and transmits said shift position signal to the transmission.

* * * * *